United States Patent [19]

Tomoshige et al.

[11] 4,134,927

[45] Jan. 16, 1979

[54] PRODUCTION OF THERMOPLASTIC OLEFIN ELASTOMERS

[75] Inventors: Toru Tomoshige, Ohtake; Riichiro Nagano, Waki; Tetsuo Imamura, Iwakuni, all of Japan

[73] Assignee: Mitsui Petrochemical Industries, Ltd., Tokyo, Japan

[21] Appl. No.: 732,194

[22] Filed: Oct. 14, 1976

[30] Foreign Application Priority Data

Oct. 17, 1975 [JP] Japan .................... 50/124349

[51] Int. Cl.² ............................. C08F 255/04
[52] U.S. Cl. .......................... 260/878 R; 526/56
[58] Field of Search ........... 260/878 R, 42.39, 42.42; 526/56

[56] References Cited

U.S. PATENT DOCUMENTS

| | | | |
|---|---|---|---|
| 3,236,917 | 2/1966 | Natta | 260/42.42 |
| 3,414,551 | 12/1968 | Reid | 526/56 |
| 3,928,497 | 12/1975 | Ohmori | 260/878 R |
| 3,959,558 | 5/1976 | MacKenzie | 260/42.42 |
| 4,003,874 | 1/1977 | Ide | 260/42.18 |

*Primary Examiner*—Paul R. Michl
*Attorney, Agent, or Firm*—Sherman & Shalloway

[57] ABSTRACT

A process for preparing thermoplastic olefin elastomers which comprises mixing and extruding in a screw extruder (A) an olefin rubber having a number average molecular weight of about 10,000 to 100,000 and composed of a copolymer of ethylene with an α-olefin containing at least 3 carbon atoms and (B) about 1 to 15 parts by weight, per 100 parts by weight of the olefin rubber (A), of a specified dicarboxylic acid monomer at about 200 to 320° C in the presence of (C) 0.02 to 3 milliequivalents, per 100 grams of the olefin rubber (A), of an alkyl peroxide, and in the absence of molecular oxygen. The thermoplastic olefin elastomers have superior mechanical properties, thermal stability, processability and adhesiveness, and find a wide range of applications, for example, as extrusion or injection molding materials, adhesives, coating agents, and modifiers for plastics and rubbers.

10 Claims, No Drawings

PRODUCTION OF THERMOPLASTIC OLEFIN ELASTOMERS

This invention relates to the production of thermoplastic olefin elastomers having improved modulus at 100% stretch, tensile strength at break and elongation at break, reduced permanent strain, a high acid value, and superior processability, thermal stability and adhesiveness by a simple improved process. The process enables a dicarboxylic acid monomer to be reacted in an increased ratio, and does not cause the formation of any substantial amount of the gelled product nor require any additional expedient such as ionic crosslinking.

Some suggestions have been made heretofore which comprise reacting (A) an olefin rubber composed of a copolymer of ethylene and an α-olefin containing at least 3 carbon atoms with (B) a dicarboxylic acid monomer selected from unsaturated dicarboxylic acids and the anhydrides thereof in the presence of an organic peroxide at an elevated temperature. For example, U.S. Pat. No. 3,236,917 (corresponding to British Pat. No. 885,969) is one of such suggestions. According to one embodiment of this suggestion, an olefin rubber such as an ethylene/propylene or ethylene/1-butene copolymer is mixed with a mono or dicarboxylic unsaturated aliphatic acid or anhydrides thereof such as maleic acid, maleic anhydride, or acrylic acid in the presence of a radical initiator such as an organic peroxide (e.g., benzoyl peroxide, tert-butyl perbenzoate, chlorobenzoyl peroxide, or tert-butyl peroxide) and the mixture is heated to a high temperature, preferably in the absence of oxygen. The grafted polymer is then suitably treated in a mix roller to plasticize and homogenize it, after which a basic agent such as organic diamines, glycols or polyvalent metal oxides (e.g., zinc oxide, calcium oxide, magnesium oxide, or lead oxide) is added.

In this patent, the mixing of the olefin rubber, the carboxylic acid monomer and the basic agent in the presence of a radical initiator is carried out by a single-stage method or two-stage method, and it is stated that elastomers having the best elastic and ageing properties can be obtained by the two-stage method as shown in the above-cited embodiment. The minimum molecular weight specifically disclosed in this patent of the olefin rubber is 130,000, and the mixing in the presence of the basic agent is carried out at 30° to 70° C., and in specific examples, at 60° C. or lower. As a heat-treatment of the grafted polymer at the highest temperature which may be carried out after the mixing of the olefin rubber with the carboxylic acid monomer in the presence of the radical initiators and before the addition of the basic agent or an acid-neutralizing substance such as zinc oxide, the patent gives Example 19 in which the mix is heated in a press at 200° C. and 70 kg/cm² for 30 minutes, and then further mixed with an antioxidant, stearic acid, carbon black and zinc oxide at 60° C. to form a composition, after which the composition is cured at 160° C.

In this patent, the strength characteristics of elastomers are further improved by ionic crosslinking using such an agent as zinc oxide because modification with a carboxylic acid monomer such as maleic acid results in elastomers with low tensile strength. In addition, as crosslinking occurs to some extent at the time of modification with maleic acid, the maleic acid-modified rubber and its ionically cross-linked product do not flow even at high temperatures, and cannot be extruded by conventional extruders. This is an essential defect of the method of this patent since the resulting product can be processed only by limited methods. In fact, in this suggestion, the mixing in the absence of a solvent is effected by means of a roll mixer, and no extruder is used for mixing at high temperatures. Naturally, the patent is quite silent on the possibility of mixing by a screw extruder at high temperatures exceeding 200° C. Furthermore, this proposal has the disadvantage that in order to obtain satisfactory tensile strength, the cross-linking of the grafted polymer must be carried out using a basic agent or an acid-neutralizing substance such as zinc oxide.

The present inventors made extensive investigations in an attempt to provide thermoplastic olefin elastomers by mixing and extruding the ingredients in a screw extruder that is commercially advantageous, without involving any disadvantages or defects of the prior suggestions. These investigations led to the discovery that thermoplastic olefin elastomers having improved modulus at 100% stretch, tensile strength at break and elongation at break, a reduced permanent strain, a high acid value, and superior processability, thermal stability and adhesiveness can be prepared without involving the disadvantages of the prior suggestions by mixing and extruding in a screw extruder (A) an olefin rubber having a number average molecular weight of about 100,000 at most, preferably about 10,000 to about 100,000 (which is consideraly lower than the lowest molecular weight disclosed in the above-cited patent) and (B) an unsaturated dicarboxylic acid monomer (including the anhydrides of the dicarboxylic acid) in a specified amount with regard to the olefin rubber in the presence of a specified amount of an alkyl peroxide, preferably in the absence of a basic agent such as organic diamines, glycols and oxides or hydroxides of the metals, at a temperature of about 200° C. to about 320° C., preferably about 220° C. to about 300° C., and in the absence of molecular oxygen. It has also been found that such a process enables the dicarboxylic acid monomer to be copolymerized in an increased ratio, and does not cause the formation of any substantial amount of gelled product nor require any additional expedient such as ionic crosslinking.

It is an object of this invention therefore to provide a process for producing thermoplastic olefin elastomers having superior improved properties by a simple means of mixing and extruding a specified olefin rubber and a specified dicarboxylic acid monomer in a screw extruder.

The above and other objects and advantages of this invention will become more apparent from the following description.

According to the present invention, there is provided a process for preparing a thermoplastic olefin elastomer which comprises mixing and extruding in a screw extruder (A) an olefin rubber having a number average molecular weight of about 10,000 to 100,000 and composed of a copolymer of ethylene with an α-olefin containing at least 3 carbon atoms with the ethylene content of the rubber being about 50 to 85 mole%, and (B) about 1 to 15 parts by weight, per 100 parts by weight of the olefin rubber (A), of a dicarboxylic acid monomer selected from the group consisting of unsaturated dicarboxylic acids and the acid anhydrides thereof at a temperature of about 200° to 320° C. in the presence of (C) 0.02 to 3 milliequivalents, per 100 grams of the olefin rubber (A), of an alkyl peroxide, and in the absence of molecular oxygen.

The number average molecular weight of the olefin rubber (A) is about 10,000 to 100,000, preferably about 20,000 to 70,000. The number average molecular weight of the polymer is measured by an osmotic pressure method using a decalin solution at 130° C.

When the number average molecular weight of the olefin rubber exceeds the above-specified upper limit, the reaction of the olefin rubber with the dicarboxylic acid monomer to an extent such as to give satisfactory properties for practical purposes results in the formation of a substantial amount of a gelled product, which in turn causes the reduction of the flowability of the reaction product to render the mixing in the extruder impossible. This tendency becomes pronounced in the presence of a basic agent such as zinc oxide. Accordingly, the process of this invention is carried out desirably using an olefin rubber having a number average molecular weight of not more than about 100,000 in the absence of the basic agent. On the other hand, if the number average molecular weight of the rubber is less than about 10,000, it is impossible to obtain elastomers having high tensile strength. Thus, the use of olefin rubbers having a number average molecular weight within the above specified range is essential in the process of this invention.

The olefin rubber (A) is composed of a copolymer of ethylene with an α-olefin containing at least 3 carbon atoms, preferably propylene, 1-butene, or 4-methyl-1-pentene. Of these, an olefin rubber composed of a copolymer of ethylene and propylene or 1-butene is preferred. Furthermore, it is essential in this invention that the olefin rubber has an ethylene content of about 50 to 85 mole%, preferably about 60 to 83 mole%. The use of copolymers having an ethylene content of more than about 85 mole% does not afford elastomers having a satisfactorily low permanent strain. On the other hand, when the ethylene content of the olefin rubber is less than about 50 mole%, the resulting elastomer has inferior tensile strength.

It is further preferred that the olefin rubber (A) should not contain a substantial amount of a diene or triene in the copolymer chain. Where it contains such a diene or triene, the amount should be limited to not more than 0.5 mole% of the olefin rubber. Accordingly, the term "olefin rubber composed of a copolymer of ethylene with an α-olefin containing at least 3 carbon atoms", as used in this application, denotes an olefin rubber which may contain not more than 0.5 mole% of a diene or triene. Since ethylene/propylene/diene copolymer rubbers (EPDM) containing much unsaturation such as those obtainable from the market may afford substantial amounts of gelled products in reactions using a screw extruder at high temperatures, and the reaction products have poor flowability, copolymer rubbers containing essentially of ethylene and α-olefins containing at least 3 carbon atoms are conveniently used in the present invention. Elastomers having poor flowability derived from ethylene/propylene/diene copolymer rubbers cannot be satisfactorily fabricated into the desired shapes by injection molding or extrusion molding.

According to the process of the invention, the olefin rubber (A) having a number average molecular weight of about 10,000 to 100,000, preferably about 20,000 to 70,000, and the dicarboxylic acid monomer (B) are reacted by being mixed and extruded at high temperatures in a screw extruder in the presence of the alkyl peroxide (C). This mixing should be carried out in the absence of molecular oxygen (i.e., in an atmosphere of an inert gas), and preferably in the absence of a basic agent such as zinc oxide, at a temperature of about 200° to 320° C., preferably about 220° to 300° C.

Examples of the dicarboxylic acid monomer (B) include maleic acid, fumaric acid, itaconic acid, citraconic acid, Nadic Acid (a tradename for endo-cis-bicyclo [2.2.1]hept-5-ene-2,3-dicarboxylic acid), maleic anhydride, citraconic anhydride, and Nadic Acid anhydride. The acid anhydrides are preferred, and maleic anhydride is most suitable. The use of maleic acid can afford modified products having good properties, but since the rate of grafting is slower than in the case of using maleic anhydride, the efficiency of operation is poor. Acrylic acid and methacrylic acid can hardly improve the properties of the olefin rubber, and therefore are not suitable in this invention.

The amount of the dicarboxylic acid monomer (B) is such that the acid number of the grafted reaction product as a final product is at least 5. The amount is about 1 to 15 parts by weight, preferably about 1.5 to 10 parts by weight, per 100 parts by weight of the olefin rubber (A). Lesser amounts of the dicarboxylic acid monomer (B) cannot give rise to satisfactorily improved properties, and amounts exceeding the upper limit render the extrusion of the polymer from the extruder unstable or impossible, and the operation cannot be stably performed continuously over a long period of time. Furthermore, the excessive amounts cause substantial deterioration in the properties of the polymer, such as reduced melt flow.

The "alkyl peroxide", as used in this application, denotes compounds resulting from the bonding of a peroxide bond (—O—O—) to the carbon atoms of an alkyl group or a substituted alkyl group, and excludes those peroxides in which the peroxide bond is bonded to a hydrogen atom, an aromatic ring, or carbonyl carbon, such as hydroperoxide, diaryl peroxides, acyl peroxide, or percarbonate esters.

The use of alkyl peroxides having a molecular weight of at least 200, preferably at least 250, and having at least two peroxide bonds per molecule give good results. Of these alkyl peroxides, those not containing an aromatic ring are more preferably used.

The use of other organic peroxides, such as hydroperoxide, acyl peroxide, or percarbonate esters, results in reduced ratios of the dicarboxylic acid monomer (B) grafted to the olefin rubber (A), and does not afford modified products having good properties. As will be shown later in a comparative experiment, benzoyl peroxide frequently used in the prior suggestions causes the dicarboxylic acid monomer to be copolymerized in a far lower ratio, and cannot be used in the process of the present invention. The ratio of the dicarboxylic acid monomer to be copolymerized also varies considerably according to the type of the initiator used, especially in a reaction using a high temperature extruder as in the present invention. This fact has been completely unknown heretofore.

Examples of suitable alkyl peroxides used in this invention are di-tert-butyl peroxide, tert-butylcumyl peroxide, dicumyl peroxide, 2,5-dimethyl-2,5-di(tert-butylperoxy)hexane, 2,5-dimethyl-2,5-di(tert-butylperoxy)hexine-3, and α,α'-di(tert-butylperoxy) diisopropylbenzene. The 2,5-dimethyl-2,5-di(tert-butylperoxy)hexane and 2,5-dimethyl-2,5-(tert-butylperoxy)hexine-3 are especially preferred.

The alkyl peroxide (C) is used in an amount of 0.02 to 3 milliequivalents, preferably 0.1 to 2 milliequivalents, per 100 g of the olefin rubber (A). The amount of the alkyl peroxide (C) is calculated as the amount of peroxide bonds therein, and therefore, specifically speaking, the above quantitative requirement means that the amount of peroxide bonds in the alkylperoxide (C) is 0.02 to 3 milliequivalents, preferably 0.1 to 2 milliequivalents, per 100 g of the olefin rubber (A).

The suitable amount of the alkyl peroxide (C) somewhat differs at times according to the mixing condition of the feed materials, and may be experimentally determined according to variations in these conditions. It is important that the alkyl peroxide should not be used in amounts exceeding the above range. Otherwise, the olefin rubber (A) would be crosslinked to no small extent, and the modified products have very poor flowability which renders them incapable of being extruded. On the other hand, when the amount of the alkyl peroxide is smaller than the lower limit of the specified range, the grafting reaction does not smoothly proceed, and modified products having good properties cannot be obtained.

The mixing and extruding of the olefin rubber (A) and the unsaturated dicarboxylic acid monomer (B) in the presence of the alkyl peroxide (C) in a screw extruder are carried out in the absence of a basic agent such as zinc oxide, magnesium oxide, calcium oxide or lead oxide, and also in the absence of molecular oxygen at a temperature of about 200° to 320° C., preferably about 220° to 300° C. If the above process is carried out in the presence of molecular oxygen such as air, the formation of a gelled product and the decomposition of the olefin rubber tend to occur, and satisfactory elastomers cannot be obtained. Preferably, the above process is performed in an atmosphere of an inert gas. Examples of the inert gas are nitrogen, argon and carbon dioxide. The oxygen concentration of such a gas should be limited to not more than 10,000 ppm, preferably not more than 1,000 ppm. If the reaction temperature is too low, the amount of an oligomer of the grafting monomer (B) increases so that the ratio of the monomer (B) to be grafted to the olefin rubber (A) decreases. Furthermore, the modified product has poor properties such as poor processability. If the reaction temperature is too high, the thermal degradation of the modified product is great to render its color unsatisfactory and deteriorate its elastomeric properties.

The time required for the mixing in an extruder varies properly according, for example, to the reaction temperature and the type of the initiator, but usually, periods of about 1 to 5 minutes will suffice.

It is preferred that before feeding the three components (A), (B) and (C) into a screw extruder as a reactor, these components should be uniformly mixed. For example, this can be accomplished by dry blending a pellet of the olefin rubber, a powder of the unsaturated dicarboxylic acid monomer, and the alkyl peroxide; or by dissolving the unsaturated dicarboxylic acid and/or the alkyl peroxide in a solvent such as benzene, impregnating the rubber pellet with the solution, and then evaporating off the solvent; or by premixing these components in a kneader such as an extruder at a temperature of not more than 100° C. A method can also be employed in which the unsaturated dicarboxylic acid monomer and the alkyl peroxide are fed from an intermediate part of the extruder, and then reacted.

Various procedures can be used to remove the unreacted unsaturated dicarboxylic acid monomer, a very small amount of the by-product oligomer, the alkyl peroxide and its decomposition products from the reaction product. For example, the reaction product may be dissolved in a solvent for these components to be removed (for example, acetone, methyl ethyl ketone, methyl isobutyl ketone, dioxane, water, methanol, ethanol, isopropanol, acetic acid esters, chloroform, benzene, or toluene), and then precipitating them using a non-solvent therefor. Or the reaction product is washed in suspension with such solvents at room temperature or at an elevated temperature. Alternatively, subsequent to the grafting reaction in the extruder, the atmosphere of the reaction system is maintained under vacuum while measures are taken to maximize the surface area of the reaction product which is still in the flowable condition.

The thermoplastic elastomer of the invention so obtained generally has a gel content (a benzene-insoluble portion at 35° C.) of not more than 10% by weight, an acid number of at least 8, preferably 14 to 50, and a melt index (ASTM D1238 65T) at 230° C. of 0.1 to 30. It can be easily fabricated into the desired articles by various fabricating techniques such as injection molding, extrusion molding, calendering and compression molding. Thermoplastic elastomers in accordance with this invention which have been produced by using an acid anhydride as component (B) show higher tensile properties when at least a part of the acid anhydride structure is converted to a free carboxylic acid structure. Preferably, therefore, such elastomers in pellet form are subjected to suitable means, for example, by contacting them with steam or air having much moisture, so as to convert the acid anhydride structure to a free carboxylic acid structure.

If desired, the thermoplastic elastomers of this invention may further contain conventional additives for thermoplastic polyolefins, such as antioxidants, ultraviolet absorbers, stabilizers, antistatic agents, mold releasing agents, lubricants, fillers, and pigments. These additives can be added before the reaction of the dicarboxylic acid monomer (B) so long as they do not adversely affect the reaction of the dicarboxylic acid monomer (B).

The antioxidants include, for example, hindered phenolic compounds such as 3,5-ditert-butyl-4-hydroxytoluene or a pentaerythritol ester of β-(3,5-ditert-butyl-1-4-hydroxyphenyl) propionic acid, hindered amine compounds, thioether compounds such as dilauryl thiodipropionate, and organic phosphite compounds such as trilauryl dithiophosphite, and are used in an amount of 0.05 to 1 part per 100 parts by weight of the olefin elastomer.

The ultraviolet absorbers include, for example, triazole compounds such as 2-(3,5-ditert-butyl-2-hydroxyphenyl) benzotriazole, benzophenone compounds such as 2-hydroxy-4-octoxybenzophenone, and nickel salts or nickel complex compounds such as N,N-dibutyl nickel carbamate or 2,2'-thiobis(4-tert-octyl phenolate) n-butylamine nickel II, and are used in an amount of 0.05 to 1 part per 100 parts by weight of the olefin elastomer.

The antistatic agents include, for example, N-alkylated products of higher aliphatic amines, N-alkylamides of higher fatty acids, and betaine compounds, and are used in an amount of 0.1 to 2 parts per 100 parts by weight of the olefin elastomer.

The mold release agents or lubricants include, for example, silicon oils, petroleum waxes, polyolefin waxes, erucic amide, oleic amide, calcium stearate and fine powdery silica, and are used in an amount of 0.1 to 2 parts per 100 parts by weight of the olefin elastomer.

The thermoplastic elastomers obtained by the process of this invention are suitable for preparing general rubber shaped articles by extrusion molding or injection molding. They also satisfactorily find applications as laminates, adhesives (solventless, solvent, dispersed types), coating agents (solventless, solvent and dispersed types), and adhesive tapes. They are especially effective for bonding metals, metal oxides, basic metal salts, glass and materials having a hydroxyl, epoxy or amino group, such as nylon, polyvinyl alcohol, a saponified product of an ethylene/vinyl acetate copolymer, or an epoxy resin.

Furthermore, they may be incorporated into plastics (e.g., polypropylene, polyethylene, nylon, polyesters, ABS, polystyrene, polyvinyl chloride, polybutene, or polypentene) to improve their adhesiveness, impact strength and suppleness.

They may also be incorporated into rubbers such as an ethylene/propylene terpolymer, polyisobutylene, or a styrene/butadiene rubber to improve their adhesiveness, vulcanizing characteristics, processability, weatherability, and paintability.

The following Examples and Comparative Examples illustrate the present invention. In the following examples, the melt index was measured by ASTM D-1238 (condition L). The modulus at 100% stretch ($M_{100}$), tensile strength at break ($T_b$) and elongation at break ($EL_b$) were measured at 25° C. and a pulling speed of 200 mm/min. using JIS No. 3 dumbbell specimens. The permanent strain (PS) was determined by stretching a JIS No. 1 dumbbell specimen at 25° C. to 100%, maintaining this state for 10 minutes, releasing the strain, allowing to stand for 10 minutes, and then reading the residual elongation between indicator lines.

EXAMPLE 1

Ten kilograms of pellets with a size of about 2 mm in diameter of an ethylene/propylene copolymer having an ethylene content of 80 mole% and a number average molecular weight of 32,000, 300 g of powdery maleic anhydride having a particle size passing a 60-mesh sieve, an 14.3 g (50 meq of peroxy groups) of 2,5-dimethyl-2,5-di(tert-butylperoxy)hexine-3 were successively charged into a 100-liter Henschel mixer through which nitrogen was flowed successively, and stirred at room temperature for 5 minutes to form a uniform mixture. The mixture was transferred to the hopper (through which nitrogen was flowing) of a 40 mm-diameter extruder. The extruder was equipped with a monoaxial screw having an I/D ratio of 28 with its top portion being of the dulmage type, and a die portion containing four holes with a diameter of 3 mm. The strand of the polymer extruded from these holes could be cooled with water, and then made into pellets by means of a cutter. The extrusion was performed by setting the rotating speed of the screw at 100 rpm, the residence time of the polymer at 60 seconds, and the cylinder temperature so as to adjust the polymer temperature to 240° C. A crude grafted reaction product in pellet form was obtained at a rate of 6.6 kg per hour.

The crude reaction product was dissolved in toluene in an amount of 1 liter per 100 g of the reaction product, and the solution was transferred to a mixer. With stirring at high speeds, 5 liters of acetone was gradually added, to precipitate the polymer in a crumb form with a diameter of 1 to 5 mm. followed by filtration. The crumblike polymer was dipped again in acetone at room temperature for 2 hours, and separated by filtration, followed by drying for one day at room temperature in a vacuum dryer. The resulting refined graft copolymer had an acid number of 19 (the proportion of the maleic anhydride introduced into the copolymer was 2.3% by weight), and a melt index of 0.6. The purified graft copolymer was extracted with acetone (at the boiling point) for 30 hours, but the acid number of the polymer did not substantially decrease. Therefore, it was confirmed that by the above purifying method, the graft copolymer was sufficiently purified. In the following examples, the purification of the crude graft copolymer was performed by this procedure.

The purified graft copolymer was compression-molded at 175° C. into a transparent pale yellow sheet having a thickness of 1 mm. Using this sheet, the modulus at 100% stretch ($M_{100}$), tensile strength at break ($T_b$), elongation at break ($EL_b$), and permanent strain (PS) of the sheet were measured at 23° C., and found to be 17 kg/cm$^2$, 81 kg/cm$^2$, 910%, and 6.7%, respectively.

The compression-molded sheet had a melt index of 0.5. The crude graft copolymer had a melt index of 1.0, an acid number of 23, a modulus at 100% stretch of 17 kg/cm$^2$, a tensile strength at break of 70 kg/cm$^2$, an elongation at break of 650%, and a permanent strain of 7.0%.

EXAMPLES 2 TO 6 AND COMPARATIVE EXAMPLES 1 TO 11

The same procedure as in Example 1 was repeated except that each of the various initiators shown in Table 1 was used in the same amount instead of the 2,5-dimethyl-2,5-di(tert-butylperoxy)hexine-3. The properties of the purified graft copolymer were measured, and the results are shown in Table 1.

Table 1

| Example (Ex.) or Comparative Example (CE.) | Initiator | Ratio of the monomer grafted based on the amount of the monomer added | AV | MI | $M_{100}$ | Tb | ELb | PS |
|---|---|---|---|---|---|---|---|---|
| Ex. 2 | 2,5-Dimethyl-2,5-di(tert-butylperoxy) hexane | 72 | 19 | 0.6 | 17 | 75 | 890 | 7.0 |
| Ex. 3 | α, α'-Di(tert-butylperoxy) diisopropylbenzene | 60 | 15 | 0.8 | 15 | 61 | 940 | 7.5 |
| Ex. 4 | Dicumyl peroxide | 60 | 15 | 0.8 | 15 | 55 | 980 | 8.2 |
| Ex. 5 | tert-Butylcumyl peroxide | 56 | 14 | 1.0 | 13 | 56 | 890 | 8.6 |
| Ex. 6 | Di-tert-butylperoxide | 40 | 10 | 1.2 | 13 | 49 | 910 | 8.1 |
| CE. 1 | 2,5-Dimethyl-2,5-di-(hydroperoxy)hexane | 24 | 6 | 2.2 | 10 | 21 | 830 | 12 |

Table 1-continued

| Example (Ex.) or Comparative Example (CE.) | Initiator | Properties of the purified graft copolymer | | | | | | |
|---|---|---|---|---|---|---|---|---|
| | | Ratio of the monomer grafted based on the amount of the monomer added | AV | MI | $M_{100}$ | Tb | ELb | PS |
| CE. 2 | Cumyl hydroperoxide | 20 | 5 | 2.5 | 9 | 15 | 910 | 13 |
| CE. 3 | tert-Butylperoxy isobutyrate | 28 | 7 | 1.2 | 10 | 23 | 870 | 12 |
| CE. 4 | Benzoyl peroxide | 12 | 3 | 1.8 | 10 | 15 | 620 | 17 |
| CE. 5 | tert-Butylperoxyisopropyl carbonate | 24 | 6 | 1.1 | 10 | 18 | 850 | 12 |
| CE. 6 | 2,5-Dimethyl-2,5-di-(benzoylperoxy)hexane | 20 | 5 | 1.2 | 9 | 15 | 700 | 12 |
| CE. 7 | Decanoyl peroxide | 12 | 3 | 4.7 | 9 | 15 | 650 | 18 |
| CE. 8 | N,N'-diisobutyronitrile | 5 | 1.3 | 8.5 | 7 | 12 | 350 | 23 |
| CE. 9 | 4-Chloro-ditert-butyl peroxide | 10 | 3 | 4.5 | 10 | 4 | 700 | 20 |
| CE. 10 | None | 1 | 0.3 | 8.5 | 7 | 11 | 300 | 25 |
| CE. 11 | Air (molecular oxygen) | 5 | 1.3 | 5.3 | 9 | 16 | 420 | 22 |

COMPARATIVE EXAMPLE 12

The same procedure as in Example 1 was performed except that the hopper part of the extruder was not sealed with nitrogen but opened to the atmosphere. Since the reaction product formed a non-uniform cross linked product, a homogeneous press sheet could not be prepared. The resulting product had an acid number of 7, a melt index of less than 0.01, a tensile strength at break of 18 kg/cm², and an elongation at break of 430%.

EXAMPLES 7 AND 8 COMPARATIVE EXAMPLES 13 TO 15

The same procedure as in Example 1 was performed except that the reaction temperature was varied. The properties of the graft copolymers after purification were measured, and the results are shown in Table 2.

Table 2

| Example (Ex.) or Comparative Example (CE.) | Reaction temperature (°C) | Properties of purified copolymer | | | | | |
|---|---|---|---|---|---|---|---|
| | | AV | MI | $M_{100}$ | Tb | ELb | PS |
| CE. 13 | 160 | 5 | 0.02 | 10 | 22 | 890 | 16 |
| CE. 14 | 180 | 6 | 0.01 | 10 | 23 | 850 | 14 |
| Ex. 7 | 200 | 16 | 0.3 | 15 | 63 | 820 | 8.0 |
| Ex. 1 | 240 | 19 | 0.6 | 17 | 80 | 910 | 6.7 |
| Ex. 8 | 300 | 23 | 1.9 | 18 | 95 | 900 | 6.5 |
| CE. 15 | 340 | 22 | 40 | 15 | 35 | 1000 | 35 |

EXAMPLES 9 TO 11 AND COMPARATIVE EXAMPLE 16

The same procedure as in Example 1 was performed except using 10 kg of a pellet with a diameter of 2 mm of an ethylene/propylene copolymer having an ethylene content of 79 mole% and a number average molecular weight of 27,000, 500 g of powdery maleic anhydride passing a 60-mesh sieve, and varying amounts of 2,5-dimethyl-2,5-di(tert-butylperoxy)hexine-3. In Example 9, the initiator was added by diluting it with 500 cc of benzene, allowing the diluted initiator to be absorbed by the ethylene/propylene copolymer, and then removing the benzene by passing a nitrogen stream.

The results are shown in Table 3.

Table 3

| Example (Ex.) or Comparative Example (CE.) | Amount of the initiator per 10 kg of the copolymer | | Properties of the purified graft copolymer | | | | | |
|---|---|---|---|---|---|---|---|---|
| | g | meq | AV | MI | $M_{100}$ | Tb | ELb | PS |
| Ex. 9 | 1.43 | 5 | 22 | 12 | 15 | 64 | 920 | 8.0 |
| Ex. 10 | 14.3 | 50 | 30 | 4.1 | 19 | 85 | 890 | 5.6 |
| Ex. 11 | 35.8 | 250 | 32 | 0.1 | 21 | 90 | 730 | 5.5 |
| CE. 16 | 71.5 | 500 | Extrusion impossible because of the formation of a crosslinked product | | | | | |

EXAMPLES 12 TO 15 AND COMPARATIVE EXAMPLE 17 AND 18

The same procedure as in Example 1 was performed except that 10 kg of each of the various olefin rubber shown in Table 4 was used. The results are shown in Table 4.

Table 4

| Example (Ex.) or Comparative Example (CE.) | Olefin rubber | | | Properties of the purified graft copolymer | | | | | |
|---|---|---|---|---|---|---|---|---|---|
| | Ethylene Content (mol %) | Type of α-olefin | Molecular weight | AV | MI | $M_{100}$ | Tb | ELb | PS |
| Ex. 1 | 80 | propylene | 32,000 | 19 | 0.6 | 17 | 81 | 910 | 6.7 |
| Ex. 12 | 60 | propylene | 30,000 | 21 | 0.85 | 12 | 54 | 720 | 9.0 |
| CE. 17 | 80 | propylene | 130,000 | 18 | under 0.01 | 20 | 100 | 300 | 23.0 |
| CE. 18 | 80 | propylene | 8,000 | 20 | above 200 | 7 | 20 | 500 | 15.0 |
| Ex. 13 | 80 | 1-butene | 15,000 | 19 | 25 | 15 | 76 | 800 | 6.0 |
| Ex. 14 | 85 | 1-butene | 100,000 | 20 | 0.10 | 30 | 180 | 450 | 10.0 |
| Ex. 15 | 60 | 4-methyl-1-pentene | 27,000 | 19 | 1.0 | 16 | 75 | 830 | 7.0 |

EXAMPLES 16 TO 22 AND COMPARATIVE EXAMPLES 19 AND 20

The same procedure as in Example 1 was performed except that each of the unsaturated dicarboxylic acids shown in Table 5 was used in the amounts indicated instead of 300 g (3.06 mole) of the maleic anhydride used in Example 1. The results are shown in Table 5.

In Comparative Example 19, the graft copolymer was purified by the method of Example 1, and then further extracted with boiling methanol, followed by drying.

Table 5

| Example (Ex.) or Comparative Example (CE.) | Type of dicarboxylic acid monomer 'B) | Amount (moles) | Properties of the purified graft copolymer | | | | | |
|---|---|---|---|---|---|---|---|---|
| | | | AV | MI | $M_{100}$ | Tb | ELb | PS |
| Ex. 16 | Maleic anhydride | 1.53 | 12 | 0.8 | 12 | 56 | 930 | 8.1 |
| Ex. 17 | Maleic anhydride | 10.2 | 45 | 0.2 | 18 | 120 | 730 | 5.1 |
| Ex. 18 | Citroconic anhydride | 3.06 | 15 | 0.7 | 14 | 60 | 830 | 8.2 |
| Ex. 19 | Nadic anhydride* | 3.06 | 16 | 0.7 | 13 | 63 | 900 | 8.1 |
| Ex. 20 | Maleic acid | 3.06 | 12 | 1.2 | 10 | 55 | 910 | 8.5 |
| Ex. 21 | Fumalic acid | 3.06 | 10 | 1.5 | 11 | 46 | 1070 | 8.7 |
| Ex. 22 | Itaconic acid | 3.06 | 10 | 1.5 | 10 | 45 | 950 | 8.7 |
| CE. 19 | Acrylic acid | 6.12 | 14 | 4.3 | 7 | 12 | 600 | 14 |
| CE. 20 | Diethyl maleate | 3.06 | | 2.1 | 9 | 20 | 800 | 21 |

*endo-cis-bicyclo(2.2.1)hept-5-ene-2,3-dicarboxylic acid anhydride

COMPARATIVE EXAMPLE 21

200 g of the same ethylene/propylene copolymer as used in Example 1 and 6 g of maleic acid were mixed by means of two rolls at 60° C. for 20 minutes. At a temperature of 20° C., 1.2 g of ditert-butyl peroxide was added, and the mixing was continued for 5 minutes. About 30 g of the resulting mixture was heated in a press at 200° C. and 70 kg/cm² for 30 minutes to afford the reaction product. The reaction product was purified by the same method as in Example 1 to afford a purified copolymer having an acid number of 4, a melt index of 0.02, a modulus at 100% stretch of 9 kg/cm², a tensile strength of 15 kg/cm², an elongation at break of 380%, and a permanent strain of 17%.

What we claim is:

1. A process for preparing a thermoplastic olefin elastomer which comprises mixing and extruding in a screw extruder in an atmosphere of an inert gas in the absence of a basic agent selected from the group consisting of organic diamines, glycols, and oxides and hydroxides of metals selected from the group consisting of alkali metals, alkaline earth metals, cadmium, zinc, lead and iron, (A) an olefin rubber having a number average molecular weight of about 10,000 to 100,000 and composed of a copolymer of ethylene with an α-olefin containing at least 3 carbon atoms with the ethylene content of the rubber being about 50 to 85 mole%, and (B) about 1 to 15 parts by weight, per 100 parts by weight of the olefin rubber (A), of a dicarboxylic acid monomer selected from the group consisting of unsaturated dicarboxylic acids and the acid anhydrides thereof at a temperature of about 200° to 320° C. in the presence of (C) 0.02 to 3 milliequivalents, per 100 grams of the olefin rubber (A), of an alkyl peroxide, and in the absence of molecular oxygen.

2. The process of claim 1 wherein the alkyl peroxide is selected from the group consisting of 2,5-dimethyl-2,5-di(tert-butyl peroxy)hexine-3, 2,5-dimethyl-2,5-di(-tert-butyl peroxy)hexine, ditert-butyl peroxide, tert-butyl cumyl peroxide, dicumyl peroxide, α,α'-di(tert-butyl peroxy)diisopropyl benzene, 2,2-ditert-butyl peroxybutane, and butyl 4,4-ditert-butylperoxy-valerate.

3. The process of claim 1 wherein the mixing and extruding are performed at a temperature of about 220° to 300° C.

4. The process of claim 1 wherein the dicarboxylic acid monomer (B) is selected from the group consisting of maleic anhydride, maleic acid, fumaric acid, itaconic acid, itaconic anhydride, citraconic acid, citraconic anhydride, endo-cis-bicyclo[2.2.1]hept-5-ene-2,3-dicarboxylic acid and its anhydride.

5. The process of claim 1 wherein the olefin rubber (A) is a copolymer of ethylene with an α-olefin selected from the group consisting of propylene, 1-butene, and 4-methyl-1-pentene.

6. The process of claim 1 wherein the olefin rubber (A) has a number average molecular weight of about 20,000 to 70,000 and has an ethylene content of about 60 to 83 mol%.

7. The process of claim 1 wherein the amount of the dicarboxylic acid monomer (B) is from about 1.5 to 10 parts by weight, per 100 parts by weight of the olefin rubber (A).

8. The process of claim 1 wherein the olefin rubber (A) is a copolymer of ethylene with an α-olefin selected from the group consisting of propylene, 1-butene, and 4-methyl-1-pentene; the dicarboxylic acid monomer (B) is selected from the group consisting of maleic anhydride, maleic acid, fumaric acid, itaconic acid, itaconic anhydride, citraconic acid, citraconic anhydride, endo-cis-bicyclo(2.2.1)hept-5-ene-2,3-dicarboxylic acid and its anhydride; and the alkyl peroxide (C) is selected from the group consisting of 2,5-dimethyl-2,5-di(tert-butyl peroxy)hexine-3, 2,5-dimethyl-2,5-di(tert-butyl peroxy)hexine, ditert-butyl peroxide, tert-butyl cumyl peroxide, dicumyl peroxide, α,α'-di(tert-butyl peroxy)-diisopropyl benzene, 2,2-ditert-butyl peroxybutane, and butyl 4,4-ditert-butylperoxy-valerate.

9. The process of claim 8 wherein the mixing and extruding are performed at a temperature of about 220° to 300° C., and wherein the olefin rubber (A) has a number average molecular weight of about 20,000 to 70,000 and an ethylene content of about 60 to 83 mol% and the amount of the dicarboxylic acid monomer (B) is from about 1.5 to 10 parts by weight, per 100 parts by weight of the olefin rubber (A).

10. The process according to claim 9 wherein the dicarboxylic acid monomer (B) is maleic anhydride and the alkyl peroxide (C) is 2,5-dimethyl-2,5-di(tert-butyl peroxy)hexane or 2,5-dimethyl-2,5-(tert-butyl peroxy)-hexine-3.

* * * * *